UNITED STATES PATENT OFFICE.

JOSÉ MARTINS GOMES VILLAS-BÔAS, OF RIO DE JANEIRO, BRAZIL.

DRAWING-ROLLER FOR SPINNING AND THE LIKE MACHINES.

1,335,208.  Specification of Letters Patent.  Patented Mar. 30, 1920.

No Drawing.  Application filed September 16, 1918.  Serial No. 254,383.

*To all whom it may concern:*

Be it known that I, José Martins Gomes Villas-Bôas, a citizen of Brazil, residing at Rua 1° de Marco No. 113, Rio de Janeiro, Brazil, have invented new and useful Improvements in Drawing-Rollers for Spinning and the like Machines, of which the following is a specification.

This invention relates to the drawing rollers of spinning machines and the like and consists in the coating of such rollers with a known gelatinous composition, such as is used in the manufacture of typographical inking rollers. The known composition, the application of which forms the basis of my invention is a mixture of 400 grams of gelatin or glue, 120 grams of glycerin and 1200 grams of water to which are added a few drops of carbolic acid. The whole is then allowed to macerate for a few hours. The metal core, or roller, to be coated is placed concentrically within a cylindrical mold into which the said composition is poured after previous treatment, for one and a half hours, in a hot water bath and the addition of a hardening solution consisting of 10 grams of alcohol and 10 grams of ammonia, or potash bichromate, in 50 grams of water. I have successfully coated drawing rollers in this manner with the composition specified. I am aware that compositions consisting mainly in a mixture of gelatin or glue, glycerin and water with the addition of a bichromate hardening solution have been used for coating the drawing rollers of spinning and like machines, and I make no claim broadly to the use of these.

I claim as my invention:

Drawing rollers for spinning and the like machines covered with a composition consisting in a mixture of gelatin (400 grams), glycerin (120 grams), and water (1200 grams) with the addition of a few drops of carbolic acid and hardened by the addition of a solution of ammonium or potassium bichromate (10 grams), in 50 grams of water prepared and applied in the manner specified.

In testimony whereof I have signed my name to this specification in the presence of two subscribing witnesses.

JOSÉ MARTINS GOMES VILLAS-BÔAS.

Witnesses:
   Syllo Tavares de Queiroz,
   Yo de Sousa Reis.